United States Patent
Michelitsch et al.

(10) Patent No.: US 9,455,427 B2
(45) Date of Patent: Sep. 27, 2016

(54) BATTERY WITH VOLTAGE-GENERATING CELLS AND INTERPOSED COMPENSATING PLATES

(75) Inventors: Martin Michelitsch, Weiz (AT); Stefan Röpke, Graz (AT); Matthias Pucher, Graz (AT); Rainer Unterberger, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 1000 days.

(21) Appl. No.: 13/518,909

(22) PCT Filed: Dec. 23, 2010

(86) PCT No.: PCT/EP2010/070694
§ 371 (c)(1),
(2), (4) Date: Oct. 25, 2012

(87) PCT Pub. No.: WO2011/076937
PCT Pub. Date: Jun. 30, 2011

(65) Prior Publication Data
US 2013/0034754 A1     Feb. 7, 2013

Related U.S. Application Data

(60) Provisional application No. 61/289,894, filed on Dec. 23, 2009, provisional application No. 61/356,071, filed on Jun. 18, 2010, provisional application No. 61/356,239, filed on Jun. 18, 2010.

(51) Int. Cl.
| | | |
|---|---|---|
| *H01M 2/10* | (2006.01) | |
| *B60L 11/18* | (2006.01) | |
| *H01M 10/625* | (2014.01) | |
| *H01M 10/647* | (2014.01) | |
| *H01M 10/61* | (2014.01) | |
| *H01M 10/6557* | (2014.01) | |

(52) U.S. Cl.
CPC ........ *H01M 2/1083* (2013.01); *B60L 11/1879* (2013.01); *H01M 10/61* (2015.04); *H01M 10/625* (2015.04); *H01M 10/647* (2015.04); *H01M 10/6557* (2015.04); *Y02T 10/7005* (2013.01); *Y02T 10/705* (2013.01)

(58) Field of Classification Search
None
See application file for complete search history.

(56) References Cited

U.S. PATENT DOCUMENTS

| | | | | |
|---|---|---|---|---|
| 6,146,783 | A | * | 11/2000 | Brohm et al. ................ 429/62 |
| 2006/0078789 | A1 | * | 4/2006 | Wegner ...................... 429/120 |
| 2006/0115719 | A1 | | 6/2006 | Jeon et al. |

FOREIGN PATENT DOCUMENTS

| | | |
|---|---|---|
| DE | 100 02 142 | 8/2000 |
| DE | 10002142 A1 | 8/2000 |
| DE | 102 23 782 | 12/2003 |
| DE | 10223782 A1 | 12/2003 |
| EP | 1 944 824 | 7/2008 |
| WO | WO0128008 A1 | 4/2001 |

OTHER PUBLICATIONS

English translation of Herbert Aug. 13, 2015.*
EPO Office action dated Nov. 9, 2015, corresponding to European Patent application 10803091.7, (6 pages).

* cited by examiner

*Primary Examiner* — Sarah A Slifka
(74) *Attorney, Agent, or Firm* — Lewis Roca Rothgerber Christie LLP

(57) ABSTRACT

A battery having a plurality of voltage-generating cells in which a plate-shaped intermediate element having elastic ribs at least on one side thereof is arranged at least between adjacent voltage-generating cells.

22 Claims, 11 Drawing Sheets

BATTERY WITH VOLTAGE-GENERATING CELLS AND INTERPOSED COMPENSATING PLATES

CROSS-REFERENCE TO RELATED APPLICATIONS

The present application is a National Stage Application of PCT International Application No. PCT/EP2010/070694 (filed on Dec. 23, 2010), under 35 U.S.C. §371, which claims priority to U.S. Provisional Patent Application No. 61/289,894 (filed on Dec. 23, 2009), U.S. Provisional Patent Application No. 61/356,239 (filed on Jun. 18, 2010), U.S. Provisional Patent Application No. 61/356,071 (filed on Jun. 18, 2010), which are each hereby incorporated by reference in their respective entireties.

FIELD OF THE INVENTION

The invention relates to a battery having a plurality of voltage-generating cells.

BACKGROUND OF THE INVENTION

Batteries are generally constructed from a plurality of voltage-generating cells in order to be able to deliver a demanded voltage, a demanded current and/or a demanded capacitance. In particular in the case of relatively high-power batteries such as are often used for electric vehicles, it is often the case that several hundred cells are connected to one another. This leads to various problems because the high currents that arise during charging and discharging lead to considerable heating of the battery, for which reason the battery is often cooled. To be able to bring the battery to its optimum operating temperature even in winter, it is also known for the batteries to be heated. A further problem during the operation of batteries, in particular if a. large number of cells are connected in series, is that the volume thereof changes depending on the state of charge and temperature. To prevent excessively high cell pressures from building up, which under some circumstances could damage the cells, "breathing" of the cells is often permitted by means of a corresponding construction of the battery.

A disadvantage of the known solutions is that they are usually technically relatively complex and therefore make the battery expensive. Furthermore, technically complex solutions generally lead to lower operational reliability of the battery.

SUMMARY OF THE INVENTION

It is therefore an object of the invention to specify an improved battery and a technically simple solution to the above-stated problems.

The invention is achieved by means of a battery of the type specified in the introduction in which a plate-shaped intermediate element which has elastic ribs at least on one side is arranged at least between two voltage-generating cells.

In accordance with the invention, length compensation can take place between the cells by virtue of the ribs being deformed to a greater or lesser extent. It is therefore not possible for an excessive pressure to build up in the cells. Here, the spring constant or elasticity of the plate-shaped intermediate element can be influenced not only through corresponding selection of the material of the plate but rather also through the design of the ribs. For example, thick ribs lead to a higher spring constant than thin ribs. The spring constant or elasticity can thus be varied within wide limits.

Within the context of the invention, "cells adjacent to one another" means cells between which there is no spacing or only a small spacing. The cells may be in contact with one another, though this is not imperative. It is also conceivable for further components to be arranged between the cells, which components partially or completely fill out the intermediate space between two cells.

Advantageous embodiments and refinements of the invention will now emerge from the subclaims and from the description in conjunction with the figures.

It is advantageous if the plate-shaped intermediate element has elastic ribs on both sides. The plate-shaped intermediate element can therefore be designed to be softer, that is to say the spring constant thereof can be kept relatively low.

It is particularly advantageous if the ribs on one side of the plate-shaped intermediate element are offset in relation to the ribs on the other side of the plate-shaped intermediate element. In this way, the central region of the plate-shaped intermediate element is, during the compression thereof, deformed in a snake-like or S-shaped manner, because the ribs of one side are pushed into the intermediate spaces on the other side of the plate-shaped intermediate element. It is thereby possible to produce a particularly soft plate-shaped intermediate element whose spring constant is particularly low.

It is furthermore advantageous if the elastic ribs are aligned obliquely in relation to the cross section. In this way, during an expansion of the cell, the ribs are not simply pushed together but rather are also bent owing to the oblique alignment. The spring constant of the plate-shaped intermediate element is therefore also dependent on the oblique slope of the ribs. The more oblique the ribs are, the softer the plate-shaped intermediate element is. A spring constant can thereby be set in a particularly simple manner.

It is particularly advantageous if the ribs bear against a cell, and a groove between two ribs delimits, together with the cell, a channel which is provided for conducting a gaseous or liquid heat carrier. In the variant of the invention, the ribs therefore perform a dual purpose, in that they firstly permit length compensation between the cells but secondly, together with the cells, also form channels through which a heat carrier can flow. As a result of the the dual purpose, the number of components required for a battery can be reduced significantly. It is particularly advantageous in this connection if the plate-shaped intermediate element has elastic ribs on both sides, because in this way, temperature control can be realized for cells on both sides of the plate.

It is expedient if at least two voltage-generating cells and at least one intermediate element are adhesively bonded to one another. In the variant of the invention, cells adhesively bonded to one another form an assembly via which forces can be transmitted. It is advantageous for no further components to be required for the connection of the cells.

It is furthermore expedient if at least two voltage-generating cells and at least one intermediate element are screwed to one another. In this way, the cells can also be detached from one another, which offers advantages in particular during the repair or disposal of a battery.

It is furthermore expedient if at least two voltage-generating cells and at least one intermediate element are pressed against one another by means of tension straps or tension rods which generate a compressive preload. In this way, a compressive preload is generated which prevents widening of the gap between two cells if a bending load is introduced into the assembly composed of cells and intermediate element, for example if the assembly is lifted at one side. Instead of clamping/tension straps, it is also possible for tension rods, for example stud bolts, to be provided which press the cells against one another via plates. The measures may self-evidently be used in addition to adhesive bonding.

It is particularly advantageous if the battery comprises a support element which is hollow and which is provided for conducting a gaseous or liquid heat carrier. In the variant of the invention, the support element thus performs a dual purpose in that it firstly absorbs bending/shear forces and secondly also contributes to the temperature control of the battery or of its cells. As a result of the the dual purpose, the number of components required for a battery can be reduced significantly.

It is particularly advantageous in this connection if a cavity of the support element is connected to a channel formed by the plate-shaped intermediate element. In this way, a heat carrier can be supplied via a support element and conducted through the channels formed by the intermediate element. In this way, temperature control of the battery can be realized in a particularly efficient manner. The feed and return to and from the ducts may self-evidently be realized by means of elements which do not have a supporting function.

It is furthermore particularly advantageous for the support element to have recesses and/or shell-shaped depressions for receiving the cells.

In this way, positioning of the cells is particularly simple in that the cells are inserted and/or adhesively bonded into the recesses/depressions of the support element. A relatively stable assembly is realized in particular with adhesive bonding.

Finally, it is expedient if a cross-shaped intermediate element and/or an L-shaped intermediate element and/or a T-shaped intermediate element and/or an I-shaped or H-shaped intermediate element and/or a shell-shaped intermediate element is arranged at least between two voltage-generating cells. In this way, firstly, the cells can be held in position relative to one another, and secondly, forces can be transmitted from one cell to the next in a highly effective manner. In a design variant of the invention, specifically, the mechanical structure of the cells is utilized to absorb a bending load arising in the battery. The cells often have a relatively massive metal casing. For example, in the case of so-called "metal can" cells, the rolled chemistry-related fittings of the cell are situated in a metal sleeve which is extremely stable and thereby protects the insides of the cell. It is thereby possible for at least a part of the bending/shear load arising in a battery to be conducted via the cell walls. A support structure for receiving the cells—if such a support structure is required at all—can thus be designed to be correspondingly more fragile. It is advantageously possible in this way for the weight of the battery and therefore of the vehicle to be reduced considerably. As a direct result of this, the driving performance of the automobile is improved.

The above embodiments and refinements of the invention may be combined with one another in any desired way.

BRIEF DESCRIPTION OF THE DRAWINGS

The present invention will be explained in more detail below on the basis of the exemplary embodiments illustrated in the schematic figures of the drawing, in which.

DETAILED DESCRIPTION OF EMBODIMENTS

FIGS. 1 to 19 illustrate the way in which a battery can be formed with the aid of various connecting means. In accordance with the present invention, there is inserted into the assembly a plate-shaped intermediate element which is illustrated in detail in FIGS. 20, 21, 22 and 25.

Figure 1:
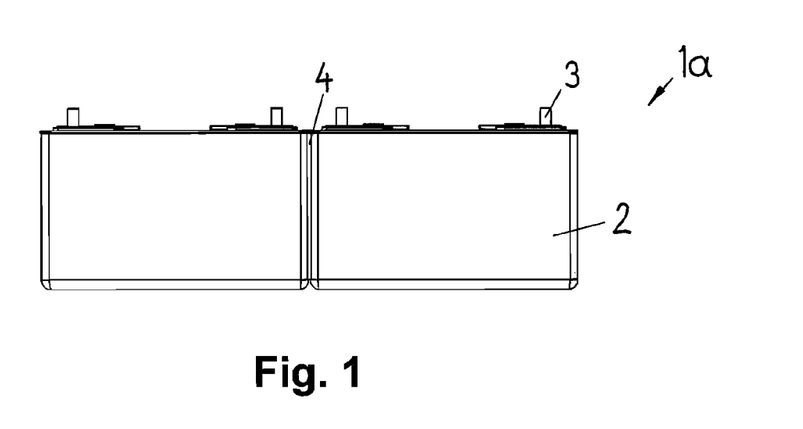
FIG. 1 illustrates a first example of a battery in accordance with the invention, in which the cells are adhesively bonded to one another.

FIG. 1 illustrates a first example of a battery 1a in accordance with the invention in a side view. The battery comprises a plurality of voltage-generating cells 2 with in each case two terminal contacts 3. In the example illustrated, the cells 2 are adhesively bonded to one another at the narrow side thereof by means of an adhesive layer 4, such that the battery 1a forms a self-contained unit even without further components. The cells 2, in particular the housing thereof (which is often composed of metal) and the adhesive bond are in this example designed such that the battery 1a is "self-supporting."

Figure 2:
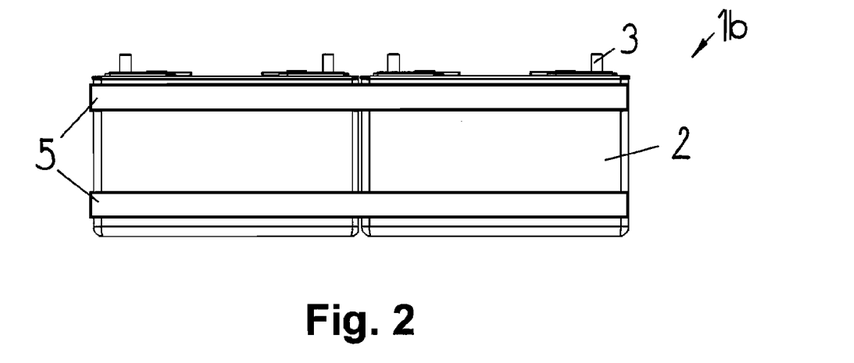
FIG. 2 illustrates a second example of a battery in accordance with the invention, in which the cells are preloaded against one another by means of tension/clamping straps.

FIG. 2 illustrates an alternative embodiment of a battery 1b in accordance with the invention which is very similar to the battery 1a illustrated in FIG. 1. Instead of an adhesive bond, however, the cells 2 are pressed against one another by means of two clamping/tension straps 5. In this way, a compressive preload is generated which prevents widening of the gap between the cells 2 in the lower region thereof if the battery 1b is lifted on one side. Instead of clamping/tension straps 5, it is also possible for tension rods, for example stud bolts, to be provided which press the cells 2 against one another via plates. The measures may self-evidently be provided in addition to an adhesive bond.

Figure 3:
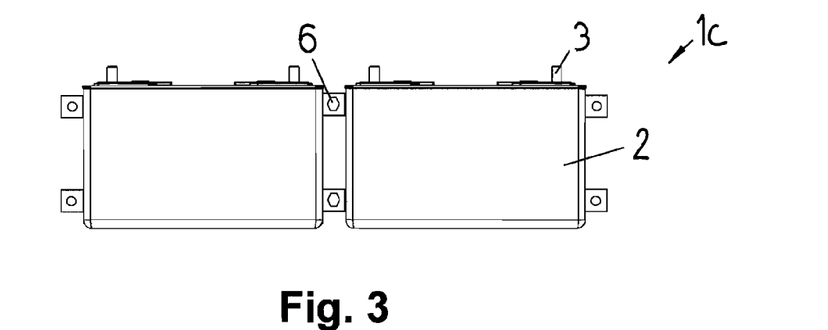
FIG. 3 illustrates a third example of a battery in accordance with the invention, in which the cells are screwed to one another.

FIG. 3 illustrates an alternative embodiment of a battery 1c in accordance with the invention, which is likewise very similar to the battery 1a illustrated in FIG. 1. Instead of an adhesive bond, the cells 2 are now connected to one another by means of screws 6. For this purpose, lugs may be adhesively bonded or welded to the cells 2. In FIGS. 1 to 3, it is also possible for cross-shaped intermediate elements and/or L-shaped intermediate elements and/or T-shaped intermediate elements and/or I-shaped intermediate elements to be provided, as illustrated in the following FIGS.

Figure 4:
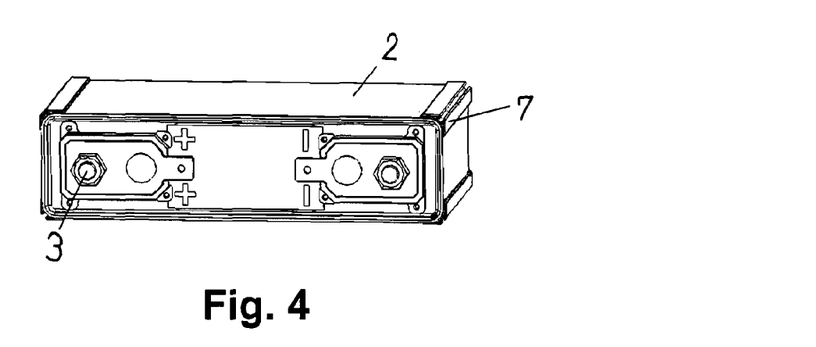
FIG. 4 illustrates a cell with holding devices fastened thereto.
Figure 5:
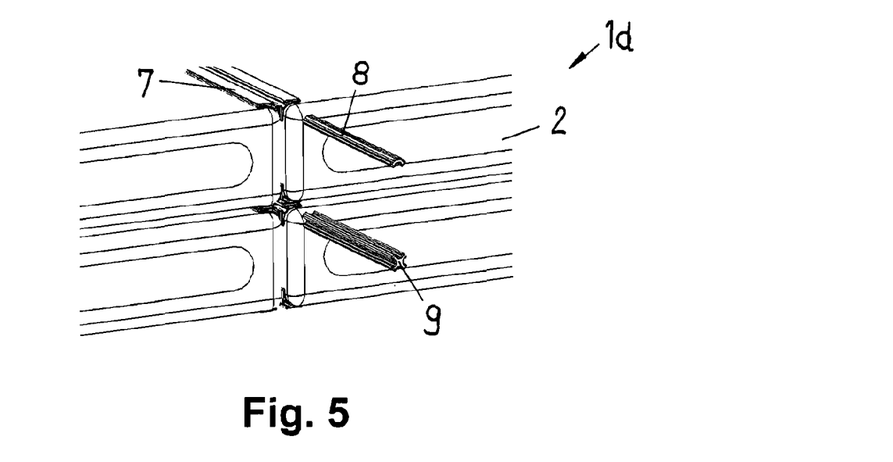
FIG. 5 illustrates, in an oblique view, cells as illustrated in FIG. 4, which cells are connected to one another, thus forming a battery, by means of connecting elements.
Figure 6:
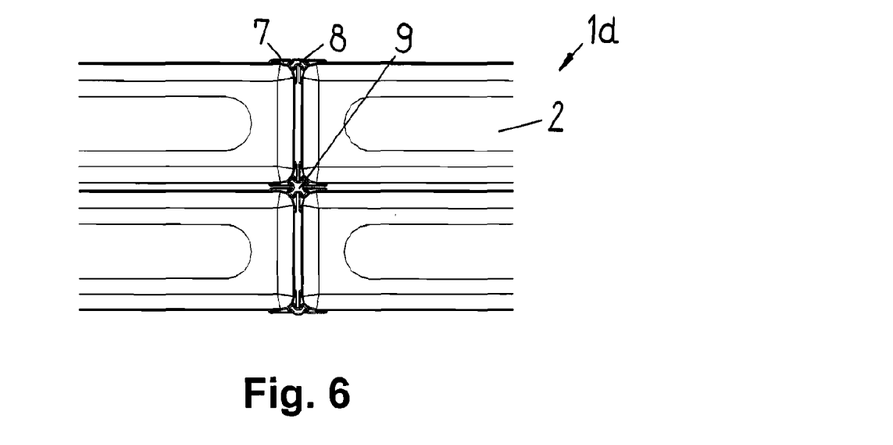
FIG. 6 illustrates the battery from FIG. 5 in a side view.

FIGS. 4 to 6 illustrate a further embodiment of a battery 1d in accordance with the invention, or rather a detail thereof in this variant, fastening elements 7 are provided on the housing of the cells 2. The fastening elements 7 may be adhesively bonded or welded to the housing, for example in the form of holding or fastening brackets. To connect a plurality of cells 2, L-shaped intermediate or connecting elements 8 or cross-shaped intermediate or connecting elements 9 are connected to the fastening elements 7, such that a self-supporting cell assembly is formed. For this purpose, a fastening element 7 may have indentations/projections, into which projections/indentations of the connecting elements 8, 9 engage. For example, a tongue and groove connection, a pin and hole connection or else a dovetail connection may be realized between the connecting elements 8, 9 and the fastening elements 7. To isolate the cells 2 from one another, the connecting elements 9 may furthermore be composed of an insulator, composed for example of plastic or ceramic. It is also conceivable for the indentations/projections to be formed directly into the housing of the cells 2, and fastening elements 7 can thereby be dispensed with. A plurality of L-shaped intermediate or connecting elements 8 or a plurality of cross-shaped intermediate or connecting elements 9 may moreover be combined to form a shell-shaped, I-shaped or H-shaped intermediate element.

Figure 7:
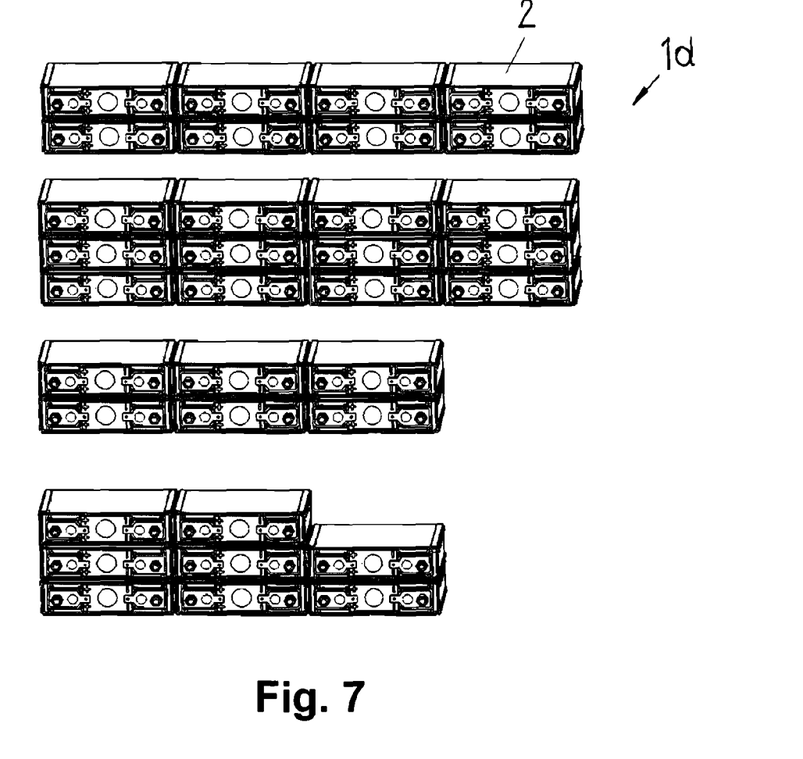
FIG. 7 illustrates various forms of batteries formed from cells as illustrated in FIG. 4.

Here, the battery 1d may be assembled in a modular manner in any desired way. For example, FIG. 7 illustrates various embodiments in this regard, specifically a 4×2 assembly, a 4×3 assembly, a 3×2 assembly and a stepped assembly. The illustrated variants are self-evidently not only suitable for a connecting method corresponding to FIGS. 4 to 6, but rather other connecting methods may self-evidently also be used to produce batteries of the type (for example the methods illustrated in FIGS. 1 to 3).

Figure 8:
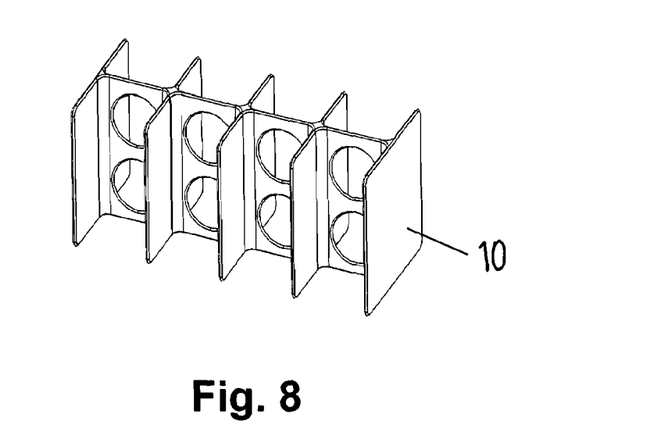
FIG. 8 illustrates a shell-shaped intermediate element provided for arranging between cells.
Figure 9:
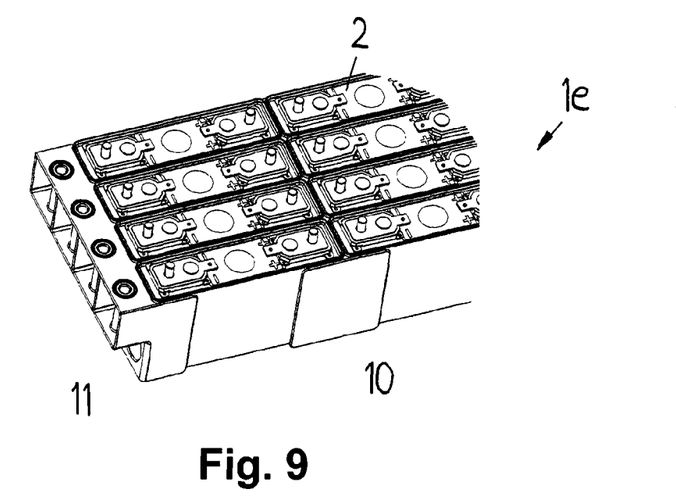
FIG. 9 illustrates a detail of a battery constructed by means of intermediate elements as illustrated in FIG. 8.

FIGS. 8 and 9 illustrate a further variant of a battery 1e in accordance with the invention, in which a plurality of cells 2 are connected to one another by means of shell-shaped intermediate elements 10. Provided at the fastening/bearing points are end elements 11 which allow the battery 1e to be mounted for example in a vehicle. To attain a self-supporting assembly, the cells 2 are for example adhesively bonded to the intermediate elements 10 and the end elements 11.

Figure 10:
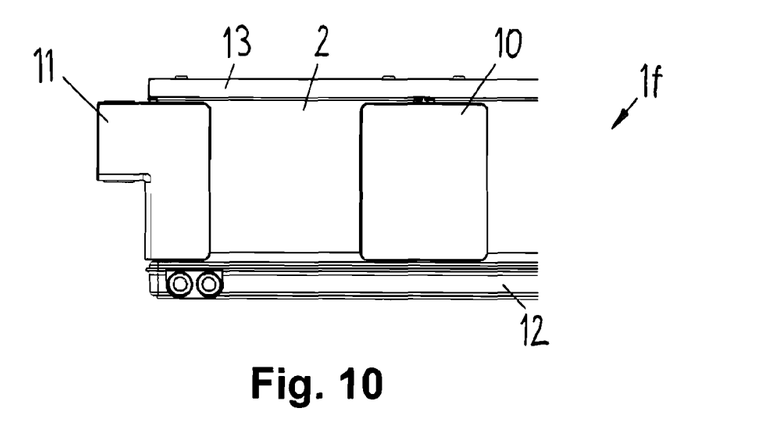
FIG. 10 illustrates the battery from FIG. 9 with an additional cooling plate and an additional cover plate in a side view.
Figure 11:
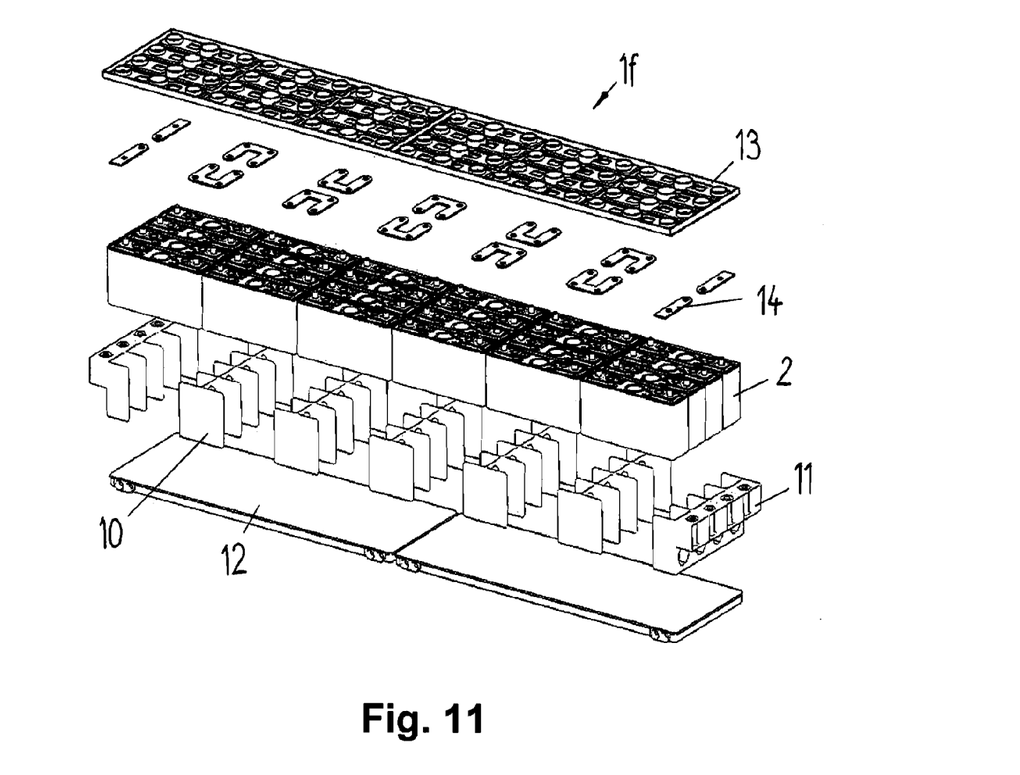
FIG. 11 illustrates the battery from FIG. 10 in an exploded illustration.
Figure 12:
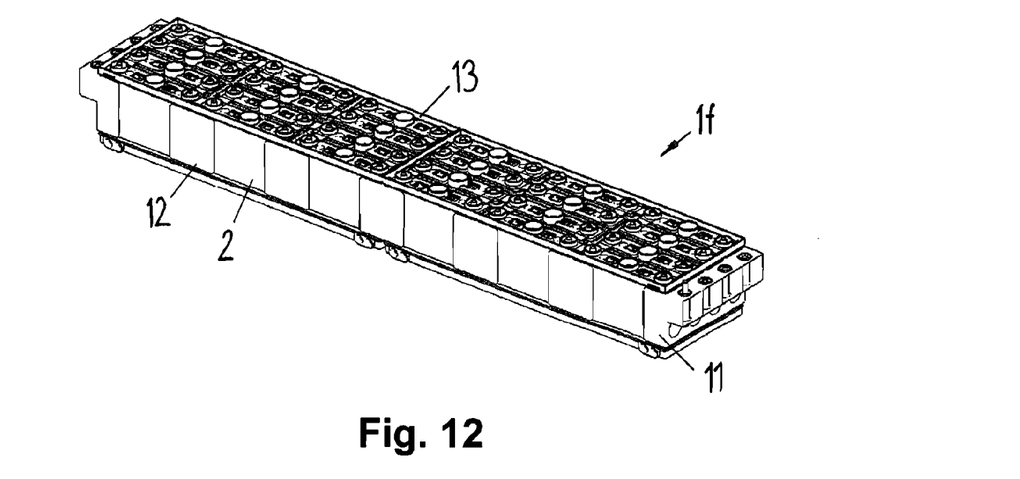
FIG. 12 illustrates the fully assembled battery from FIG. 11 in an oblique view.

FIGS. 10 to 12 illustrate a modification of the battery 1e illustrated in FIGS. 8 and 9 in the form of a battery 1f, which additionally has two cooling plates 12 for conducting a gaseous or liquid heat carrier and a cover plate 13. Additionally illustrated are cell connectors 14 which serve for producing the electrical connection between the cells 2 (note: in the preceding FIGS., cell connectors have been omitted for a clearer illustration). FIG. 10 illustrates the battery 1f in a side view, FIG. 11 illustrates the battery 1f in an exploded illustration, and FIG. 12 illustrates the battery 1f in an oblique view.

Figure 13:
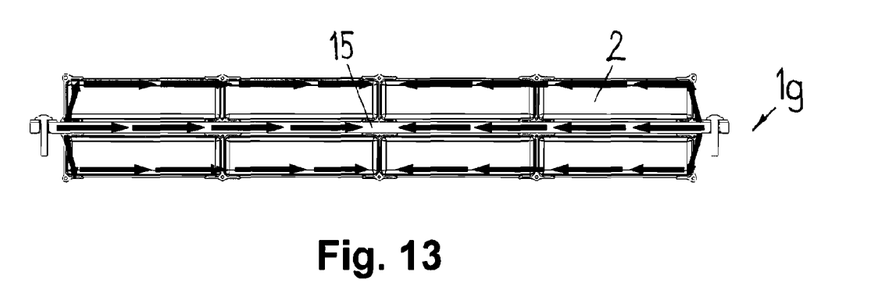
FIG. 13 illustrates a battery having a support element arranged between a plurality of cells.
Figure 14:
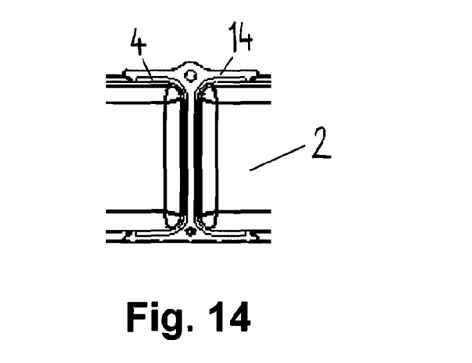
FIG. 14 illustrates a detail view of the battery illustrated in FIG. 13.
Figure 15:
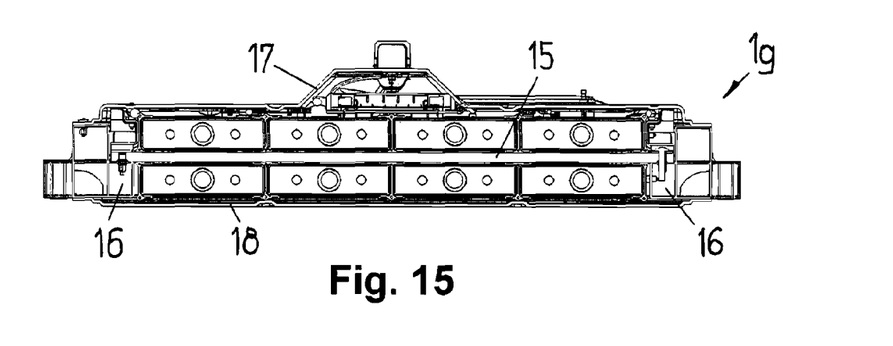
FIG. 15 illustrates the battery from FIG. 14 installed in a vehicle and protected against environmental influences by cover plates.

FIGS. 13 to 15 illustrate a further variant of a battery 1g in accordance with the invention, in which I-shaped or H-shaped intermediate elements 14 are arranged between the cells, via which intermediate elements the cells 2 are connected to one another by means of adhesive layers 4. The battery 1g additionally comprises a support element 15, for example, an aluminum profile.

FIG. 13 illustrates the battery 1g additionally with arrows which are intended to indicate the force flux. It should be noted here that this is not intended to imply that only compressive stresses prevail in the component. It is self-evident that tensile stresses prevail in the lower region of the battery 1g when the battery bends downward, or is mounted horizontally at the left and at the right. FIG. 14 illustrates a detail view of an adhesive bond between two cells 2, and FIG. 15 finally illustrates the battery 1g fastened (for example screwed) to two longitudinal beams 16 of a vehicle. The battery is additionally protected against environmental influences by an upper cover 17 and a tower cover 18.

Figure 16:
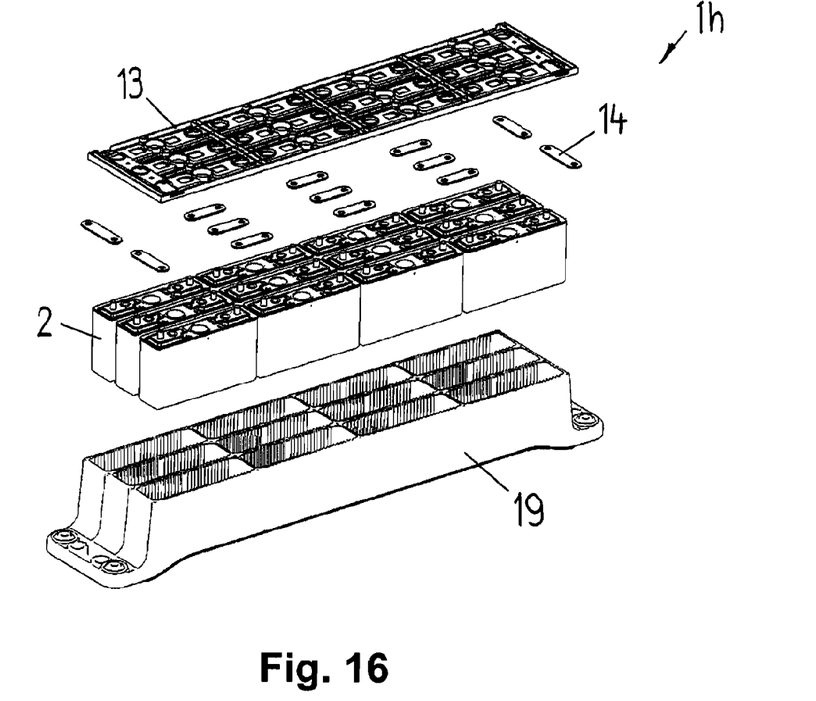
FIG. 16 illustrates, in an exploded illustration, a battery having a support element which has shell-shaped depressions.
Figure 17:
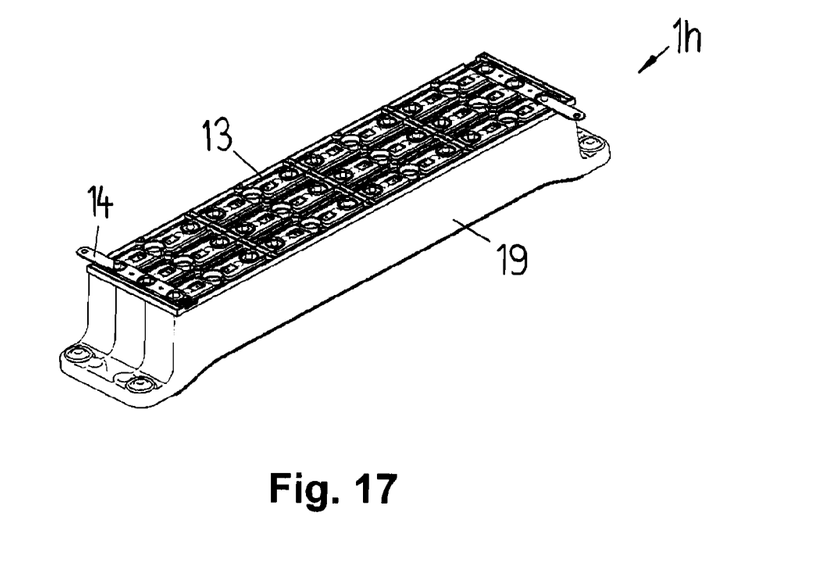
FIG. 17 illustrates the fully assembled battery from FIG. 16 in an oblique view.
Figure 18:
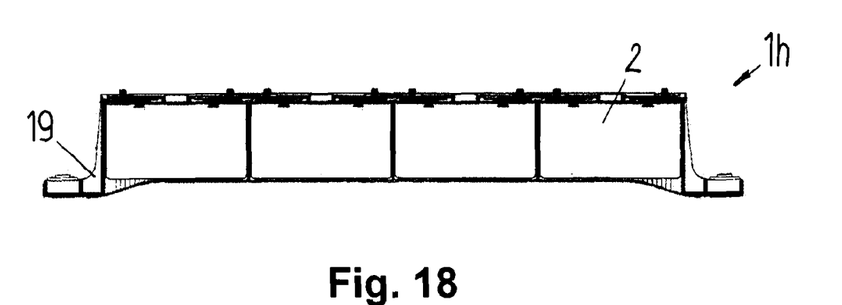
FIG. 18 illustrates the fully assembled battery from FIG. 16 in a side view.

FIGS. 16 to 18 illustrate a further variant of a battery 1h in accordance with the invention, which is very similar to the batteries 1e and 1f illustrated in FIGS. 9 to 12. In contrast to the batteries, the battery 1h however has a support element 19 which comprises recesses or shell-shaped depressions for receiving the cells 2. The webs of the shells illustrated, for example the transverse webs of the support element 19, may also partially be omitted. This is the case in particular if cross-shaped, L-shaped, T-shaped, I-shaped or H-shaped intermediate elements 8, 9, 14 are arranged between the cells 2. The support element 19 may for example be composed of relatively soft plastic. In particular if the cells 2 are adhesively bonded into the support element 19, a structure is nevertheless obtained which is capable of bearing very high loads. FIG. 16 illustrates the battery 1h in an exploded illustration, FIG. 17 illustrates the battery 1h in an oblique view, and FIG. 18 illustrates the battery in a side view.

Figure 19:
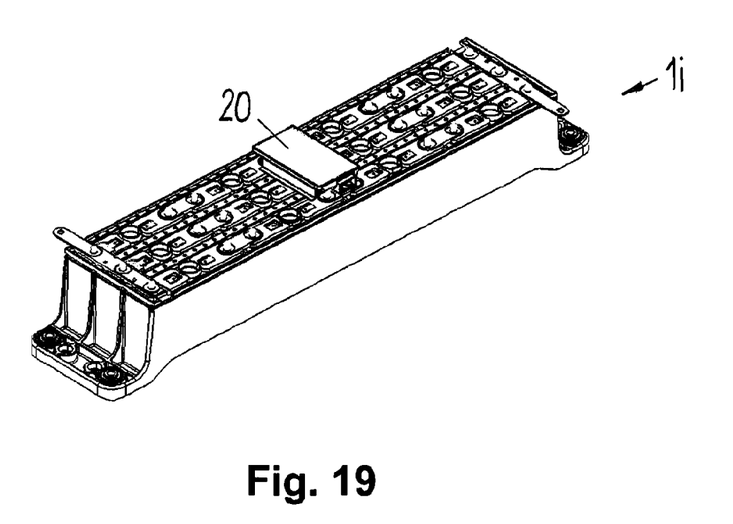
FIG. 19 illustrates the battery from FIG. 17 with an additional electronic circuit.

FIG. 19 illustrates a variant of a battery 1i in accordance with the invention, which is very similar to the battery 1h illustrated in FIGS. 16 to 18. In contrast thereto, the battery 1i, however, also comprises an electronic circuit 20 arranged on top of the battery 1i, the electronic circuit being for example a cell monitoring unit which serves for example for balancing the cells 2.

Figure 20:
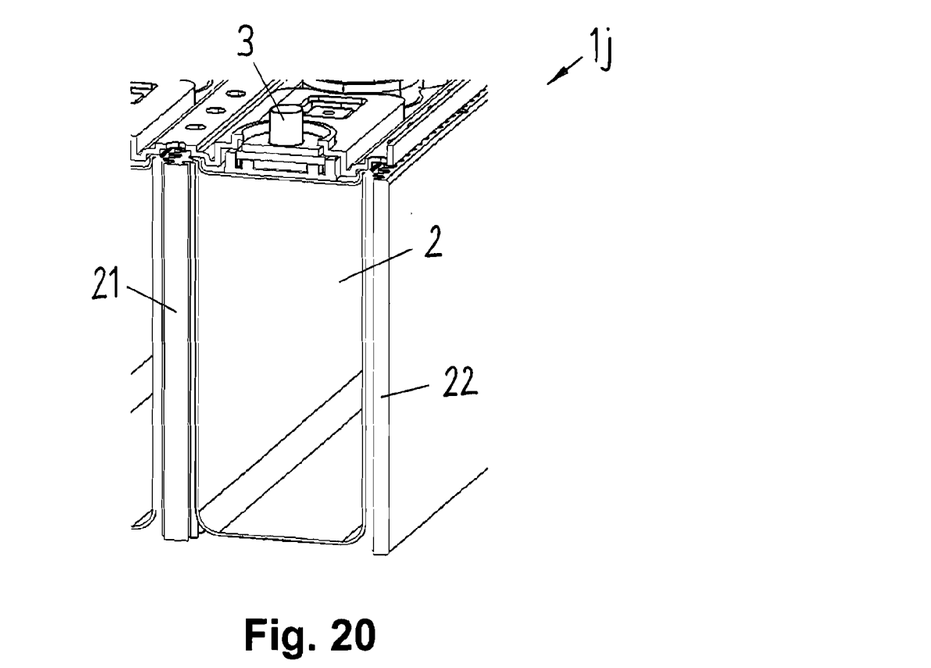
FIG. 20 illustrates, in an oblique view, a battery with plate-shaped intermediate elements which have elastic ribs.
Figure 21:
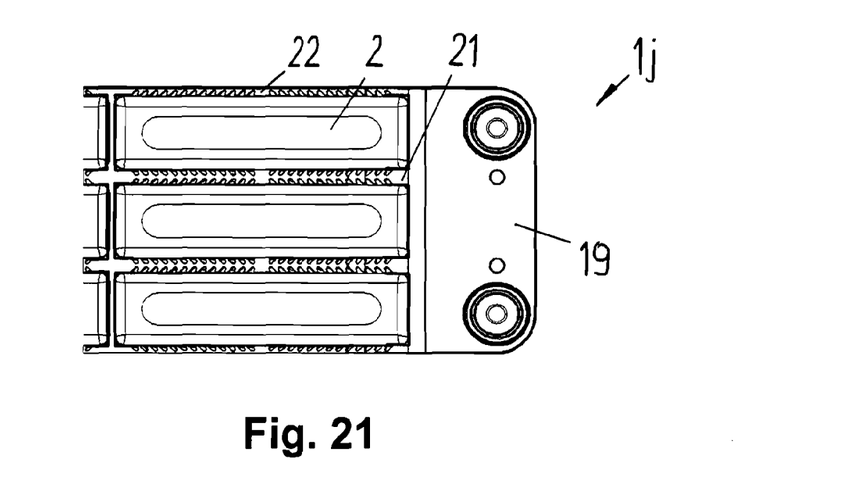
FIG. 21 illustrates the battery from FIG. 20 in a plan view.
Figure 22:
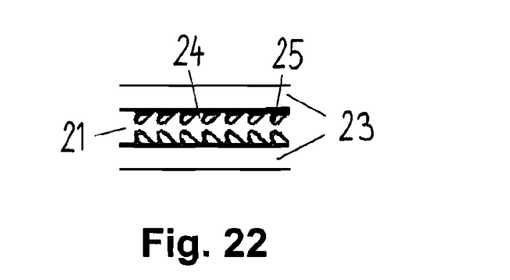
FIG. 22 illustrates a plate having elastic ribs in a detail view.

FIGS. 20 to 22 now illustrate a battery 1j in which a plate-shaped intermediate element 21 in accordance with the invention which has elastic ribs 24 on both sides is arranged at least between two voltage-generating cells 2. Furthermore, on the edge of one cell 2, there is provided a plate-shaped intermediate element 22 which has elastic ribs 24 only on the side facing towards the cell 2. It would self-evidently also be possible for the intermediate element 22 to be arranged between two cells 2.

The ribs 24 bear against a cell 2 and, owing to their elasticity, permit length compensation between the cells 2. Furthermore, a groove between two ribs 24 forms, together with the housing 23 of the cell 2, a channel 25 which is provided for conducting a gaseous or liquid heat carrier. The intermediate elements 21 and 22 thus perform a dual purpose. The cells 2 are arranged together with the intermediate elements 21 and 22 in a support element 19. FIG. 20 illustrates the battery 1j in an oblique view, FIG. 21 illustrates the battery 1j in a plan view, and FIG. 22 illustrates the formation of a channel 25 in a detail view.

In the example illustrated, the elastic ribs 24 are aligned obliquely in relation to the cross section (see FIG. 22). The elasticity or spring constant of the plate-shaped intermediate elements 21 and 22 can thereby be set in a particularly effective manner to a predefined value, for example by means of corresponding inclination of the ribs 24. It would, however, also be conceivable for the ribs 24 to project perpendicularly out of the plate-shaped intermediate elements 21 and 22.

In the example illustrated, the ribs 24 on one side of the plate-shaped intermediate element 21 are moreover arranged directly opposite the ribs 24 on the other side of the plate-shaped intermediate element 21. In FIG. 22, therefore, the upper ribs 24 are arranged directly above the ribs 24 situated therebelow. It would however also be conceivable for the ribs 24 on one side of the plate-shaped intermediate element 21 to be offset in relation to the ribs 24 on the other side of the plate-shaped intermediate element 21. In FIG. 22, the upper ribs 24 would then, for example, be arranged above the channels 25 situated therebelow. As is easily conceivable, the central line of the plate-shaped intermediate element 21 will, when the latter is compressed, then be deformed in a snake-like or S-shaped manner. In this embodiment, the plate-shaped intermediate element 21 is particularly soft and can be compressed to a particularly great extent.

FIG. 19 illustrates the plate-shaped intermediate elements 21 and 22 in an assembly formed substantially by the cells 2 and the support element 19. Alternatively or in addition, however, the other connecting methods illustrated in FIGS. 1 to 19 may be used in conjunction with the plate-shaped intermediate elements 21 and 22 in accordance with the invention. In particular, cross-shaped, L-shaped, T-shaped, I-shaped or H-shaped intermediate elements 8, 9, 14 may be used in combination with the plate-shaped intermediate elements 21 and 22 in accordance with the invention.

The plate-shaped intermediate element 21 or 22 is for example arranged in that region of the cells 2 which is free from cross-shaped, L-shaped, T-shaped, I-shaped or H-shaped intermediate elements 8, 9, 14, so as to yield a substantially rigid cell assembly. Alternatively, the plate-shaped intermediate elements 21 and 22 may also bear against the cross-shaped, L-shaped, T-shaped, I-shaped or H-shaped intermediate elements 8, 9, 14, in particular against the side flanks thereof. It is self-evidently also possible for the plate-shaped intermediate elements 21 and 22 to be arranged between a cell 2 and a cross-shaped, L-shaped, T-shaped, I-shaped or H-shaped intermediate element 8, 9, 14, which however results in a loss of rigidity of the cell assembly under some circumstances.

Figure 23:
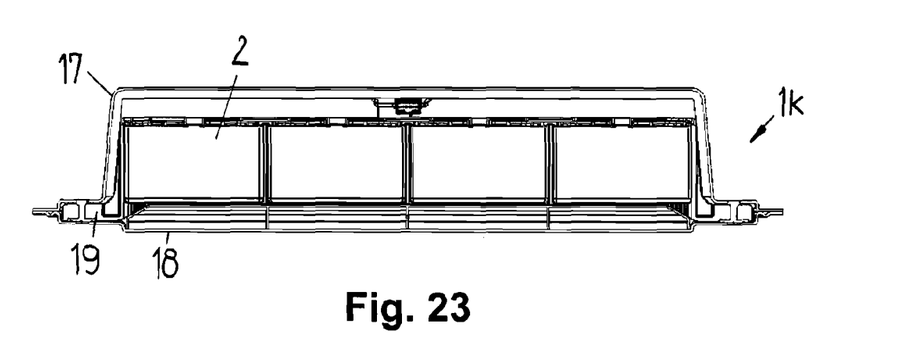
FIG. 23 illustrates, in a side view, the battery from FIG. 21 with an additional upper and lower cover.
Figure 24:
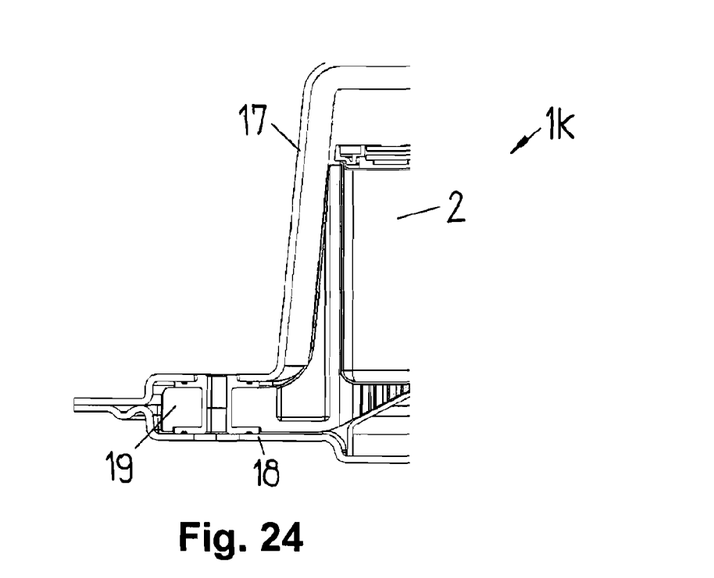
FIG. 24 illustrates a detail view of the battery from FIG. 23.

FIGS. 23 to 24 now illustrate a further variant of a battery 1k in accordance with the invention which is very similar to the battery 1j illustrated in FIGS. 20 to 22. In contrast thereto, an upper cover 17 and a lower cover 18 are arranged around the assembly comprising the support element 19, the cells 2 and the intermediate elements 21 and 22. The covers 17 and 18 may self-evidently also perform a supporting function, that is to say absorb part of the bending load acting on the battery 1k. To prevent buckling or bulging of the relatively thin covers 17 and 18, these may also be provided with beads and/or ribs.

Figure 25:
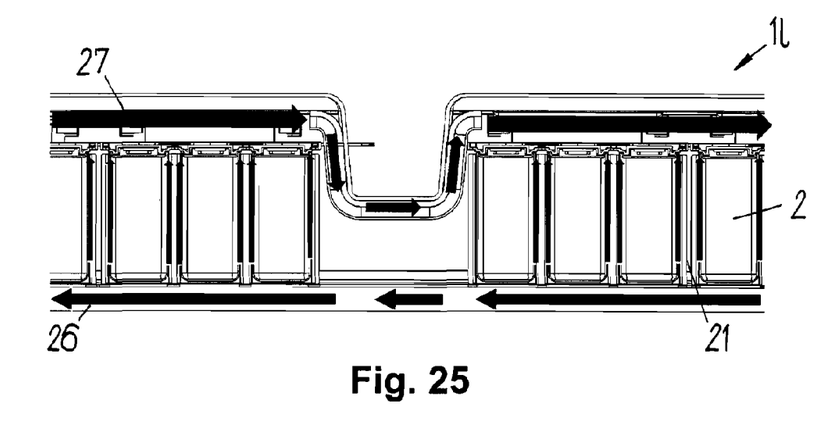
FIG. 25 illustrates a battery having a hollow support element which is provided for conducting a heat carrier.

FIG. 25 finally illustrates a further variant of a battery 11 in accordance with the invention, which comprises an arrangement of cells 2 and intermediate elements 21 and 22 as already illustrated in FIG. 20, and also a lower support element 26 and an upper support element 27. The two support elements 26 and 27 are hollow and are provided for conducting a gaseous or liquid heat carrier. Specifically, the heat carrier flows via the lower support element 26 (which forms the inlet), the ducts 25 (see also FIG. 22) and the upper support element 27 (which forms the outlet). Temperature control (cooling or heating) of the battery 11 can thus be realized in a particularly efficient manner.

Since the pressure of the heat carrier varies along the support elements 26 and 27, it is possible for holes of different size via which the heat carrier flows to or from the ducts 25 to be provided in the support elements 26 and 27 in order to attain a uniform flow through the ducts 25. It is self-evidently also possible for the upper support element 27 to form the inlet and for the lower support element 26 to form the outlet.

It is pointed out at this juncture that the batteries 1a to 11 illustrated in FIGS. 1 to 25 may also be varied, in particular combined with one another.

Finally, it is pointed out that FIGS. 1 to 25 are in part highly simplified diagrammatic illustrations. In reality, a battery 1a to 11 in accordance with the invention may also deviate from the illustration, in particular may comprise additional components not illustrated here. It is finally pointed out that the illustrations are not necessarily to scale, and proportions of real components may deviate from the proportions of the components illustrated.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery comprising:
   a plurality of voltage-generating cells arranged along a first direction; and
   an intermediate element arranged between adjacent ones of the voltage-generating cells, the intermediate element comprising:
   a continuous base; and
   a plurality of elastic ribs protruding from a face of the continuous base toward one of the voltage-generating cells, adjacent ones of the ribs being spaced from each other in a second direction,
   wherein the continuous base extends beyond a base of at least one of the ribs in the second direction and in a direction opposite to the second direction.

2. The battery of claim 1, wherein the elastic ribs protrude from both faces of the continuous base.

3. The battery of claim 2, wherein the ribs protruding from one face of the continuous base are offset in relation to the ribs protruding from the other face of the continuous base.

4. The battery of claim 1, wherein the elastic ribs are aligned obliquely in relation to the cross-section of the intermediate element.

5. The battery of claim 1, wherein the elastic ribs contact a respective one of the voltage-generating cells.

6. The battery of claim 5, wherein the intermediate element has a groove between adjacent ones of the elastic ribs which, together with the respective one of the voltage-generating cells, defines a channel through which a coolant flows to absorb heat from the voltage-generating cells.

7. The battery of claim 1, wherein the adjacent ones of the voltage-generating cells and the intermediate element are mechanically fastened to one another.

8. The battery of claim 1, further comprising tension elements configured to press the adjacent ones of the voltage-generating cells and the intermediate element against one another through the generation of a compressive pre-load.

9. The battery of claim 8, wherein the tension elements comprise one of tension straps or tension rods.

10. The battery of claim 1, further comprising a support element which absorbs heat from the voltage-generating cells.

11. The battery of claim 10, wherein the support element comprises a heat exchanger configured to absorb heat from the voltage-generating cells.

12. The battery of claim 11, wherein the support element is hollow and a coolant flows through the hollow support element to absorb heat from the voltage-generating cells.

13. The battery of claim 10, wherein the support element has a cavity which is connected to a channel.

14. The battery of claim 10, wherein the support element comprises a plurality of recesses, each of the plurality of recesses accommodating a respective one of the voltage-generating cells.

15. The battery of claim 10, wherein the support element comprises a plurality of depressions, each of the plurality of depressions accommodating a respective one of the voltage-generating cells.

16. The battery of claim 11, wherein the intermediate element has a cross-shaped, a T-shaped, an I-shaped, or an H-shaped cross-section.

17. A battery comprising:
a plurality of voltage-generating cells arranged along a first direction;
an intermediate element arranged between adjacent ones of the voltage-generating cells, the intermediate element comprising:
a continuous base; and
a plurality of elastic ribs protruding from a face of the continuous base toward one of the voltage-generating cells, adjacent ones of the ribs being spaced from each other in a second direction; and
a support element which supports the voltage-generating cells and absorbs heat from the voltage-generating cells,
wherein the continuous base extends beyond a base of at least one of the ribs in the second direction and in a direction opposite to the second direction.

18. The battery of claim 17, wherein the support element comprises a heat exchanger configured to absorb heat from the voltage-generating cells.

19. The battery of claim 17, wherein the support element is hollow, and a coolant flows through the hollow support element to absorb heat from the voltage-generating cells.

20. The battery of claim 17, wherein the support element comprises a plurality of recesses, each of the plurality of recesses accommodating a respective one of the voltage-generating cells.

21. The battery of claim 1, wherein the adjacent ones of the voltage-generating cells and the intermediate element are adhesively bonded to one another.

22. The battery of claim 1, wherein each of the ribs protrudes to have a height above the continuous base that is less than or equal to half of a thickness of the intermediate element in the first direction.

* * * * *